No. 652,125. Patented June 19, 1900.
F. C. LILLIS.
COMBINED DUST AND SCRUBBING PAN.
(Application filed Feb. 26, 1900.)
(No Model.)
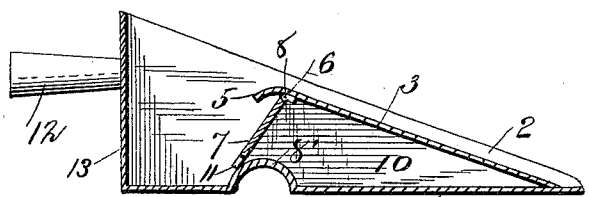
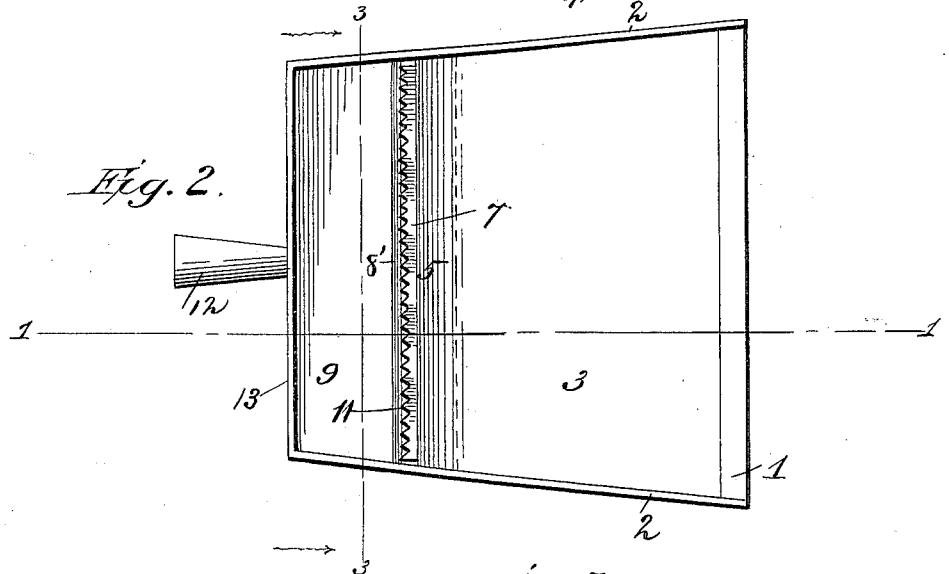
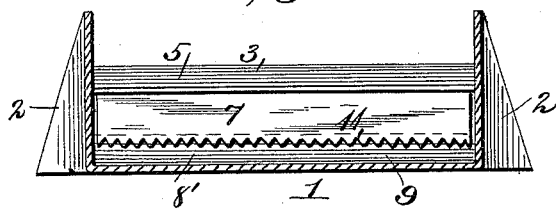

United States Patent Office.

FRANK C. LILLIS, OF LOCKPORT, NEW YORK.

COMBINED DUST AND SCRUBBING PAN.

SPECIFICATION forming part of Letters Patent No. 652,125, dated June 19, 1900.

Application filed February 26, 1900. Serial No. 6,607. (No model.)

*To all whom it may concern:*

Be it known that I, FRANK C. LILLIS, a citizen of the United States, residing at Lockport, in the county of Niagara and State of New York, have invented new and useful Improvements in a Combined Dust and Scrubbing Pan, of which the following is a specification.

My invention relates to improvements in dust-pans or, more particularly, to combined dust and scrubbing pans.

The objects of my invention are to provide an improved device of this character which may be used as a receptacle of either dust or water or a combination of both.

My pan is so constructed that its two functions do not conflict. The dust is confined in one chamber and water in another. My improved construction also provides means of separating coarse dirt from the water, thus preventing the fouling of the pan. My pan also combines the advantages of cheapness, simplicity, and efficiency.

In the drawings which accompanying this specification and of which they form a part, Figure 1 is a longitudinal section of my improved pan. Fig. 2 is a plan view of the same. Fig. 3 is a transverse section of the same.

Like numerals of reference designate like parts wherever they occur in the drawings.

The numeral 1 designates a pan with diverging sides 2. An inclined plane 3 is soldered or otherwise joined to the sides 2 and bottom 4. The joints must be made watertight. The sides 2 project above the inclined plane 3, and thus provide guards or guides to confine the dust or water, so it can be swept up into the pan. The inclined plane 3 has formed integral therewith a lip 5, which protects the hinge 6 of door 7. Door 7 is pivoted on a pintle 8 secured to part 3. The hinge 6 thus formed is placed under the projecting lip 5. Said door 7 is inclined backward and rests against the raised portion 8', which serves as an abutment for the door and also as a partition to divide the pan into two compartments 9 and 10 for dirt and water, respectively. The door or drop 7 is serrated on its lower edge or provided with V-shaped notches 11, which form a strainer that enables one by slightly tilting the pan to compel the water to flow into chamber 10, leaving the dirt behind it in the chamber 9. A handle 12, of ordinary construction, is attached to the back 13 of the pan.

The method of operating my device is as follows: The pan is placed on the floor and held by the handle 12 and slightly tilted forward. The water or dirt, or a combination of both, can then be easily swept up the inclined plane and into compartment 9. The water will then flow through the strainer 11 into compartment 10, leaving the coarse dirt behind. The method of emptying the pan is obvious. The lip 5 protects the hinge from dirt and also limits the swing of the door.

I do not wish to be limited as to material or details of construction, as these may be varied in many particulars without departing from the spirit of my invention.

Having thus described my invention, what I claim, and desire to secure by Letters Patent, is—

1. In a combined dust and scrubbing pan the combination of a pan with diverging sides, an inclined portion attached to said pan on two sides and one end, a projecting lip formed integral with said inclined portion, and a drop or door hinged at the top on a hinge attached to the under side of said lip, substantially as described.

2. In a combined dust and scrubbing pan the combination of a pan with diverging sides, an inclined portion attached to said pan on two sides and one end, and a drop or door pivoted or hinged at the top on a hinge attached to the upper end of said inclined plane, substantially as described.

3. In a combined dust and scrubbing pan the combination of a pan with diverging sides, a partition in said pan extending transversely the bottom, an inclined portion secured on three sides, and a serrated door hinged at the top on a hinge fastened near the free end of said inclined plane, substantially as described.

In testimony whereof I have hereunto set my hand in presence of two subscribing witnesses.

FRANK C. LILLIS.

Witnesses:
HERMAN F. RHODEY,
W. CURTISS.